United States Patent Office 2,941,961
Patented June 21, 1960

2,941,961

SILICA-ALUMINA COMPOSITIONS AND METHOD FOR THE PREPARATION THEREOF

David G. Braithwaite, Chicago, Ill., assignor to Nalco Chemical Company, Chicago, Ill., a corporation of Delaware No Drawing. Filed Oct. 13, 1955, Ser. No. 540,318

12 Claims. (Cl. 252—455)

This invention relates to silica-alumina compositions, more particularly silica-alumina catalysts, and to a new and improved process for the preparation thereof.

In the manufacture of silica-alumina compositions of the type employed as catalysts for the cracking of petroleum hydrocarbons, the most common procedure is to neutralize a dilute alkali metal silicate aqueous solution with a dilute aqueous solution of an acid and then impregnate the resultant precipitated silicic acid with aluminum sulfate from which alumina is precipitated by reaction with aqueous ammonia. The employment of aqueous ammonia is a disagreeable manufacturing step due to the volatility of the ammonia.

One of the objects of the present invention is to provide a new and improved process for making silica-alumina compositions which does not involve the employment of aqueous ammonia or other ammonium compounds which liberate ammonia gas.

A further object of the invention is to provide a new and improved process for manufacturing silica-alumina compositions which results in compositions that are suitable for use as catalysts, for example, in the cracking of petroleum hydrocarbons.

Another object of the invention is to produce glass-like silica-alumina compositions in the form of very dense microspheres having satisfactory physical and chemical properties for use as catalysts in fluidized catalytic processes.

An additional object of the invention is to provide a process for producing silica-alumina compositions having satisfactory physical and chemical characteristics for employment as catalysts characterized by the fact that some of the alumina present in the finished product is derived from an anion source and another portion of the alumina present in the finished product is derived from a cation source as distinguished from the standard procedure of making catalysts wherein all of the alumina comes from a cation source.

Another object of the invention is to provide a new and improved method for producing silica-alumina compositions characterized by the fact that the resultant product is essentially a clear glass-like material in microspherical form with substantially no opaque particles and no interfaces between different phases of the microsphere which would tend to produce a weaker particle.

An additional object of the invention is to produce new and useful, very dense, silica-alumina, glass-like microspheres which exhibit high surface area and optimum pore volume.

Another object of the invention is to provide a new and improved process and improved silica-alumina compositions wherein the products obtained consist predominantly of silicia but contain a relatively high proportion of alumina as compared with standard compositions normally employed at the present time as cracking catalysts.

A further object of the invention is to prepare silica-alumina catalysts characterized by good steam stability. Other objects will appear hereinafter.

In accordance with the invention these objects are accomplished by preparing a silica-alumina composition by a procedure which involves the following steps:

(1) The silica is precipitated from an alkaline aqueous solution containing an aldonate or an aldonic acid (such as gluconic acid) by adding an aqueous solution of an acid thereto, preferably an aqueous solution of a mineral acid, for example, sulfuric acid or hydrochloric acid, having a concentration sufficiently low to prevent localized reaction and substantial heat generation during the addition of the aqueous acid solution.

(2) The quantity of the aqueous acid solution added to the alkaline aqueous silicate solution is sufficient to precipitate silica in hydrous form and to lower the pH in the resultant solution, preferably until the solution is still mildly alkaline (e.g., around pH 8 to 10.5), although the pH can be reduced to as low as about 5 in this step.

(3) An aqueous solution of an aluminum salt in which the aluminum exists in the anion (e.g., sodium aluminate or calcium aluminate) is added to the slurry obtained from step 2, increasing the pH slightly and precipitating alumina in hydrous form. The added solution may also contain aldonates or aldonic acids.

(4) An acidic aqueous solution of an aluminum salt in which aluminum is present in the cation only (e.g., aluminum sulfate or aluminum chloride, preferably the former), is added to the slurry obtained from step 3 to lower the pH of the resultant slurry, preferably to about pH 4.5 or 5, and to precipitate alumina in hydrous form, simultaneously impregnating the silica gel with alumina precipitated from both of the added aluminum salts. The salt solution added in this step may also contain aldonates or aldonic acids.

(5) The dilution of the aqueous solution of aluminum salt in step 3 is preferably such that the weight ratio of water to said salt, expressed as $Na_2Al_2O_4$, is at least 7.5:1 and preferably about 15:1, or more. The volume dilution of the sodium aluminate solution is usually at least 5:1 and preferably around 10:1. More dilute solutions can be used but do not substantially improve the results and tend to create additional problems in removing water from the final product. While catalysts obtained by using relatively concentrated aluminate solutions are useful, it has been found in the practice of the invention that alumina precipitated from a concentrated aluminate solution is not the same as alumina precipitated from the dilute aluminate solution and the resultant compositions derived by the employment of dilute aluminate solutions are more desirable for employment in catalytic processes, especially in catalytic processes for cracking petroleum hydrocarbons.

(6). The amount of aldonate or aldonic acid, calculated as gluconic acid, present in the reactions set forth in the steps above is at least 1%, preferably between about 2% and 10% by weight of the $Al_2O_3$.

(7) The slurry obtained after step 4 is preferably filtered to increase the total solids concentration to an excess of 8% by weight of the composition. This filtration step is optional but it is particularly important where it is desired to produce microspheres having a particle size within the range of 20 microns to 100 microns, which is a desirable particle size for fluidized catalysts. The filtering step also effects a substantial purification by the removal of dissolved salts and enhances the formation of a continuous phase in the microspherical particles that are subsequently formed. If the slurry is filtered and it is desired to spray dry the filter cake, the latter should be reslurried with enough water to produce a pumpable mixture.

The relative proportions of silica and alumina in the final product can be varied but the products prepared in accordance with the invention preferably consists essentially of 55% to 95% by weight of silica and 5% to 45% by weight of alumina on a dry basis, that is, without taking into consideration the water present in the gel structure of the silica and alumina. The invention is very well adapted to the manufacture of a standard catalyst containing 87% by weight of silica ($SiO_2$) and 13% by weight of alumina ($Al_2O_3$). In making such a product, the concentration of alumina, expressed as $Al_2O_3$, in the slurry prior to filtration or dewatering is preferably about 0.8% by weight.

The invention is particularly well adapted for the manufacture of silica-alumina compositions containing on a dry basis 20% to 40% by weight of alumina, expressed as $Al_2O_3$, the remainder being substantially silica. Such compositions have greater steam stability than standard catalysts containing say 13% of alumina.

It has been found that when the silica-alumina compositions are prepared in accordance with this invention in the presence of an aldonate or aldonic acid, preferably gluconic acid, the resultant composition has a very high fluid density which is much greater than that obtained when the aldonic acid is not present.

The aldonic acid employed in the practice of the invention can be obtained by the oxidation of an aldose or in any other suitable manner. If gluconic acid is used as such, it is preferably employed in the form of an aqueous solution having a concentration of about 50% of gluconic acid. Other examples of aldonic acids and salts thereof which can be used in the practice of the invention are galactonic, arabonic, xylonic, and mannonic. The aldonic acids exist in several forms and the invention contemplates the use of one or more of these forms or mixtures thereof, including the lactone forms, for example, the gamma lactone form of gluconic acid. Commercial gluconic acid is available as a 50% aqueous solution containing approximately 99% gluconic acid and 1% glucose.

Since the aldonic acid is added to an alkaline solution in the procedures used, it will be apparent that it actually exists in solution in the form of a salt, e.g., sodium gluconate. Instead of employing the free aldonic acid in the preparation of the silica-alumina compositions, salts thereof can be used, preferably the sodium salts. It will be understood, however, that the invention is not limited with respect to the type of aldonate employed. Other examples of suitable aldonates are the potassium, zinc, magnesium, calcium, and lithium salts of gluconic acid or other aldonic acids. If the silico-alumina is prepared under acid conditions, the free aldonic acid would normally be used rather than a salt thereof.

The amount of the aldonic acid or aldonate which should be employed is that amount which will produce an appreciable increase in the fluid density in the resultant silica-alumina compositions along with other desirable physical and chemical characteristics. I have found that amounts of aldonic acids or aldonate equal to between about 1% and about 10% by weight of the $Al_2O_3$ in the composition produced is satisfactory.

The source of the silica employed in the practice of the invention can be commercial water glass or any other alkaline aqueous solution of sodium silicate or potassium silicate. The silicate employed is preferably an orthosilicate or can be a metasilicate. A typical sodium silicate solution for the practice of the invention consists essentially of 28% $SiO_2$ and 9.1% $Na_2O$, the remainder being water.

The acid which is added to the aqueous alkaline solution to precipitate the silica can be any dilute acid but is preferably a dilute mineral acid, for example, sulfuric acid or hydrochloric acid. The concentration, temperature and rate of acid addition can be varied in order to vary the pore volume, the pore diameter, and the surface characteristics of the finished catalysts. When the acid employed is an aqueous solution of sulfuric acid, it is preferable to use a concentration of around 25% to 35% $H_2SO_4$. Higher concentrations can be used but concentrations which are too high should be avoided to preclude the generation of heat and localized action. With the higher concentrations of acid it is desirable to maintain adequate agitation and this is true where the acid concentration of sulfuric acid is around 35%.

The relative concentration of $SiO_2$ in the slurry during the acid addition is comparatively low, say around 1% to 10% by weight, and the reaction which occurs is not violent because of the relatively large quantities of water present. Nevertheless, the generation of heat and localized action are to be avoided by using the precautions previously indicated.

The temperature of the reaction mixture is subject to variation but is preferably within the range of 40° F. to 140° F. in each of the various stages of the reaction. In general, the temperature of the reaction mixture during the precipitation of the silica and alumina should be above the freezing temperature and below the boiling point of water.

If the precipitation has been effected at a low temperature, and it is desired to filter the resultant slurry before drying, it has been found that heating the slurry to a temperature within the range of 100° F. to 190° F., preferably about 110° F. to 150° F., is an aid to filtration.

The slurry containing the silica and alumina in hydrous form, for example, as a hydrous gel, is dried in such a manner as to form microsperical particles. This is preferably accomplished by spray drying. The spray drying temperature is ordinarily within the range of 200° F. to 1000° F. The temperature used will depend upon such factors as the quantity of material to be dried and the quantity of air used in the drying. The evaporation rate will vary depending on the quantity of air used in the drying. The temperature of the particles which are being dried is preferably within the range of 150° F. to 300° F. at the completion of the drying.

The drying is preferably effected by a process in which the silica-alumina particles to be dried and a hot air stream are moving in the same direction for the entire drying period. This is usually referred to as concurrent drying as distinguished from countercurrent drying of the type carried out in a cyclone apparatus. Concurrent drying has the advantage for the purpose of the present invention that it gives large particles an opportunity to dry before they can adhere to the walls of the drier or to other particles.

The invention will be further illustrated but is not limited by the following examples in which the quantities are stated in parts by weight unless otherwise indicated.

*Example 1*

To a mixture consisting of 3120 gallons of water, 575 gallons of sodium silicate (28.8% $SiO_2$), and 5.75 gallons of 50% gluconic acid at a temperature of 120° F. was added with agitation 190 gallons of 35% sulfuric acid over a 60 minute period. The pH of the resultant slurry was about 10.0.

To the resultant precipitated silicic acid gel was added 2680 gallons of water at a temperature of 64° F. over a 17 minute period. Next there was added 244 gallons of an aqueous solution of sodium aluminate (27% $Al_2O_3$). The sodium aluminate was diluted with one volume of water for each volume of sodium aluminate solution prior to addition to the batch. The aluminate solution was added over a period of 24 minutes, followed by mixing for five minutes. The mixture had a temperature of 84° F. and a pH of 11.0.

To the resultant slurry was then added 596 gallons of alum (aluminum sulfate) (7.6% $Al_2O_3$) over a period of 30 minutes, giving a final temperature of 108° F. and a pH of 4.5 to 5.0.

In this process the addition of the sulfuric acid to the alkaline sodium silicate lowers the pH but the resultant mixture is still on the alkaline side. The addition of the sodium aluminate causes the precipitation of alumina and at the same time raises the pH slightly. The subsequent addition of the aluminum sulfate lowers the pH to the acid side, simultaneously impregnating the silica gel with alumina precipitated both from the sodium aluminate and the aluminum sulfate.

The resultant slurry was filtered on a vacuum rotary filter. The filter cake was then reslurried with water to a pumpable mixture and spray dried by concurrent drying in the manner previously described herein.

An aqueous suspension of the spray dried material was prepared and filtered on washing filters to remove soluble salts to limits as follows:

Percent by weight
Sodium salts, expressed as $Na_2O$_____Less than 0.02
Sulfate salts, expressed as $SO_4$_____Less than 0.5

The purified washed catalyst was so dried that the particle temperature did not exceed 230° F. and was subjected to such drying until the volatile content was below 15% by weight. The alumina ($Al_2O_3$) content was 46.1% by weight. The apparent bulk density was 0.87.

*Example 2*

To a mixture consisting of 3100 gallons of water, 598 gallons of sodium silicate (28.6% $SiO_2$) and 7.6 gallons of 50% gluconic acid was added with agitation 216 gallons of 35% sulfuric acid in 60 minutes.

To the resultant precipitated silicic acid gel was added a mixture consisting of 150 gallons sodium aluminate, 1350 gallons water and 2.1 gallons of 50% gluconic acid, and the resultant mixture was thoroughly agitated. Next there was added with thorough agitation a mixture consisting of 394 gallons of alum (7.6% $Al_2O_3$) and 1.5 gallons of 50% gluconic acid.

To the resultant mixture there was added 3900 gallons of water. The final temperature was 120° F. and the final pH was 4.5. The resultant slurry was heated to 190° F. and filtered on a vacuum rotary filter. The filter cake was then reslurried with water to a pumpable mixture and spray dried by concurrent drying in the manner previously described.

An equeous suspension of the spray dried material was prepared and filtered on washing filters to remove soluble salts to the limits set forth in Example 1.

The purified washed catalyst was so dried that the particle temperature did not exceed 230° F. and was subjected to such drying until the volatile content was below 15% by weight. The alumina ($Al_2O_3$) content was 28.2% by weight, on a dry basis. The apparent bulk density was 0.80.

*Example 3*

To a mixture consisting of 3100 gallons of water, 598 gallons sodium silicate (28.6% $SiO_2$) and 7.6 gallons of 50% gluconic acid was added with agitation 216 gallons of 35% sulfuric acid over a period of 60 minutes. To the resultant precipitated silicic acid gel was added a mixture consisting of 194 gallons of sodium aluminate, 1746 gallons of water and 2.7 gallons of 50% gluconic acid, and the resultant mixture was thoroughly agitated. Next there was added a mixture consisting of 510 gallons of alum (7.6% $Al_2O_3$) and 1.75 gallons of 50% gluconic acid with thorough agitation. The final temperature was 120° F. and the final pH was 4.5. The final slurry was heated to 190° F. prior to dewatering as described in Example 1. The final catalyst product contained 33.7% alumina ($Al_2O_3$) and had an apparent bulk density of 0.55.

*Example 4*

A mixture consisting of 3100 gallons of water, 595 gallons of sodium silicate (28.6% $SiO_2$) and 7.6 gallons of 50% gluconic acid was prepared which had a temperature of 120° F. To this mixture 197 gallons of 34.6% sulfuric acid was added over a period of 52 minutes.

The final temperature of the mixture was 118° F. and it had a pH of 9.5 to 10.0.

To the resultant precipitated silicic acid gel was added a mixture consisting of 2390 gallons of water, 244 gallons of sodium aluminate (27% $Al_2O_3$) and 3.5 gallons of 50% gluconic acid over a period of 34 minutes. To the resultant slurry was added a mixture consisting of 760 gallons alum (7.6% $Al_2O_3$) and 2.3 gallons of 50% gluconic acid over a period of 35 minutes. The final temperature of the mixture was 94° F. and its pH was 4.2 to 4.5. The product was worked up as described in Example 1 and was found to have an alumina content of 41.8% by weight on a dry basis. The bulk density of the product was 0.58.

*Example 5*

An aqueous solution was prepared consisting of 3100 gallons of water, 598 gallons of sodium silicate (28.6% $SiO_2$) and 7.6 gallons of 50% gluconic acid. To this solution was added with agitation 194 gallons of 35% sulfuric acid over a period of 60 minutes.

To the resultant precipitated silicic acid gel was added a mixture consisting of 115 gallons of sodium aluminate, 1035 gallons of water and 1.5 gallons of 50% gluconic acid.

To the slurry obtained was added in succession 260 gallons of alum (7.6% $Al_2O_3$) and 2300 gallons of water. The final temperature was 120° F. and the final pH was 5.0. The final slurry was heated to 190° F. prior to dewatering as described in Example 1. The resultant product had a bulk density of 0.49 and an alumina content of 22.5% by weight on a dry basis.

The foregoing examples illustrate the preparation of silica-alumina catalysts with various proportions of alkali metal silicate, aldonic acid, soluble aluminum salts containing the aluminum in the anion portion, and soluble aluminum salts containing the aluminum in the cation portion. In all cases satisfactory cracking catalysts of high density were obtained without employing a volatile neutralizing agent such as aqueous ammonia.

The catalysts prepared as described in the examples were evaluated in a fluidized fixed bed type hydrocarbon cracking unit using a cracking temperature of around 860° F. to 870° F. and a processing period of 15 minutes. The total volume of oil was 142 cc. and the quantity of catalyst charged to the unit was varied to the desired conversion.

Prior to use, the catalyst was steamed for ten hours at a pressure of 40 pounds per square inch gauge at a temperature of 1200° F. In this steaming process water is allowed to drip on the catalyst and heat is applied separately while maintaining the aforesaid pressure.

In each series of tests comparative evaluations were made with a standard catalyst prepared by the conventional ammonium hydroxide neutralizing method.

The catalysts prepared as described in the examples showed approximately equivalent gasoline production to the standard catalyst and about the same dry gas formation and catalyst deposit (coke, etc.) at various rates of conversion. All of the catalysts prepared in the examples showed good steam stability. As will be recognized by those skilled in the art, steam stability is an important catalyst characteristic because steam is in contact with the catalyst during the oil stripping and regeneration periods of normal catalyst cracking operations.

The silica-alumina compositions herein described can be employed alone or in association with other oxides, including, for example, magnesia, zirconia, titania, thoria, chromium oxides and/or boron oxides.

The high densities exhibited by the products of this invention make them especially useful as catalyst bases. Because of their high density, the activity rating of a given catalyst in a given volume can be greatly improved by extending the catalyst on a silica-alumina base of the type produced by this invention.

In addition to providing a method of preparing silica-alumina compositions of high density by a process which avoids the use of ammonium hydroxide, the invention also provides a method of preparing silica-alumina microspheres which are characterized by a clear, glass-like structure exhibiting continuity of phase. This structure has the advantage that it contains no opaque particles and no interfaces which would tend to produce a particle having poor attrition characteristics. It will be appreciated that this is especially advantageous where the silica-alumina microspheres are employed as catalysts or as carriers for catalysts in fluidized processes where the catalyst is maintained in suspension in the reacting vapors during the reaction.

The expression "alumina in hydrous form" is intended to cover the various states in which $Al_2O_3$ exists when combined with water. The expression "silica in hydrous form" is intended to cover the various states in which $SiO_2$ exists when combined with water.

The invention is hereby claimed as follows:

1. A process for preparing silica-alumina compositions which comprises precipitating silica in hydrous form by adding to an aqueous alkaline silicate solution a quantity of an acid from the group consisting of sulfuric acid and hydrochloric acid, adding to the resultant slurry an aqueous solution of a soluble inorganic aluminum salt containing the aluminum in the anion portion, said salt being from the group consisting of sodium aluminate and calcium aluminate, adding to the resultant slurry an aqueous solution of a soluble inorganic aluminum salt containing aluminum in the cation portion, said last-named aluminum salt being from the group consisting of aluminum sulfate and aluminum chloride, and recovering the resultant solid product containing silica in hydrous form impregnated with alumina precipitated from an aluminum salt in which the aluminum exists in the anion portion of the salt and from an aluminum salt in which the aluminum exists in the cation portion of the salt, at least one of the aforementioned reactions taking place in the presence of a compound from the group consisting of aldonic acids and aldonates, the quantity of said last named compound, calculated as gluconic acid, being at least 1% by weight of the aluminum, calculated as $Al_2O_3$, in the resultant product, and the silica predominating over the alumina in said product.

2. A process for preparing silica-alumina compositions which comprises precipitating silica in hydrous form by adding to an aqueous alkaline silicate solution a quantity of an acid from the group consisting of sulfuric acid and hydrochloric acid, adding to the resultant slurry an aqueous solution of a soluble inorganic aluminum salt containing the aluminum in the anion portion, said salt being from the group consisting of sodium aluminate and calcium aluminate, the weight ratio of water to said salt, expressed as $Na_2Al_2O_4$, being at least 7.5:1, adding to the resultant slurry an aqueous solution of a soluble inorganic aluminum salt containing aluminum in the cation portion, said last-named aluminum salt being from the group consisting of aluminum sulfate and aluminum chloride, and recovering the resultant solid product containing silica in hydrous form impregnated with alumina precipitated from an aluminum salt in which the aluminum exists in the anion portion of the salt and from an aluminum salt in which the aluminum exists in the cation portion of the salt, the aforementioned reactions taking place in the presence of a compound from the group consisting of aldonic acids and aldonates, the quantity of said last named compound, calculated as gluconic acid, being at least 1% by weight of the aluminum, calculated as $Al_2O_3$, in the resultant product, and the silica predominating over the alumina in said product.

3. A process for preparing silica-alumina compositions which comprises precipitating silica in hydrous form by adding to an aqueous alkaline silicate solution a quantity of an acid from the group consisting of sulfuric acid and hydrochloric acid sufficient to precipitate the silica in hydrous form while retaining the pH about 7, adding to the resultant slurry a quantity of an aqueous solution of a soluble alkaline inorganic aluminum salt containing the aluminum in the anion portion, said salt being from the group consisting of sodium aluminate and calcium aluminate, said quantity being sufficient to precipitate alumina in hydrous form, adding to the resultant mixture a quantity of an aqueous solution of a soluble acidic inorganic aluminum salt containing aluminum in the cation portion, said last-named aluminum salt being from the group consisting of aluminum sulfate and aluminum chloride, and in an amount sufficient to precipitate alumina in an acidic medium, and recovering the resultant solid product containing silica in hydrous form impregnated with alumina precipitated from an alumina salt in which the aluminum exists in the anion portion of the salt and from an aluminum salt in which the aluminum exists in the cation portion of the salt, the aforementioned reactions taking place in the presence of a compound from the group consisting of aldonic acids and aldonates, the quantity of said compound calculated as gluconic acid being between 1% and 10% by weight of the $Al_2O_3$, and the silica predominating over the alumina in said product.

4. A process for preparing silica-alumina compositions which comprises precipitating silica in hydrous form by adding to an aqueous alkaline silicate solution a quantity of an acid from the group consisting of sulfuric acid and hydrochloric acid, adding to the resultant slurry an aqueous solution of a soluble inorganic aluminum salt containing the aluminum in the anion portion, said salt being from the group consisting of sodium aluminate and calcium aluminate, adding to the resultant slurry an aqueous solution of a soluble inorganic aluminum salt containing the aluminum in the cation portion, said last-named aluminum salt being from the group consisting of aluminum sulfate and aluminum chloride, and recovering the resultant solid product containing silica in hydrous form impregnated with alumina precipitated from an aluminum salt in which the aluminum exists in the anion portion of the salt and from an aluminum salt in which the aluminum exists in the cation portion of the salt, the quantities of said silicate and said aluminum salts being sufficient to produce a silica-alumina content of about 55% to 95% by weight of silica, expressed as $SiO_2$, and about 45% to 5% by weight of alumina, expressed as $Al_2O_3$, on a dry basis, the aforementioned reactions taking place in the presence of a compound from the group consisting of aldonic acids and aldonates, the quantity of said compound calculated as gluconic acid being between 1% and 10% by weight of the $Al_2O_3$.

5. The process according to claim 4 wherein said compound is an aldonic acid.

6. The process according to claim 4 wherein said compound is an aldonate.

7. The process according to claim 4 wherein said compound is sodium gluconate.

8. A process for preparing silica-alumina compositions which comprises precipitating silica in hydrous form by adding to an aqueous alkaline sodium silicate solution a quantity of an aqueous solution of sulfuric acid sufficient to precipitate the silica in hydrous form while retaining the pH of the resultant slurry above 7, adding to the resultant slurry a quantity of an aqueous solution of sodium aluminate sufficient to precipitate alumina, adding to the resultant slurry an aqueous solution of aluminum sulfate sufficient to render the mixture acidic to a pH below about 5 and to precipitate alumina in hydrous form both from the sodium aluminate and from the aluminum sulfate and recovering the resultant product containing silica in hydrous form impregnated with alumina precipitated from the sodium aluminate in which the aluminum exists in the anion portion of the salt and from aluminum sulfate in which the aluminum exists in the cation portion of the salt, the aforementioned reactions taking place in the presence of gluconic acid, the quantity of said acid being between 1% and 10% by weight of the $Al_2O_3$, and the silica predominating over the alumina in said product.

9. A process for preparing silica-alumina compositions which comprises precipitating silica in hydrous form by adding to an aqueous alkaline sodium silicate solution a quantity of an aqueous solution of sulfuric acid sufficient to precipitate the silica in hydrous form while retaining the pH of the resultant slurry above 7, adding to the resultant slurry a quantity of an aqueous solution of sodium aluminate sufficient to precipitate alumina, adding to the resultant slurry an aqueous solution of aluminum sulfate sufficient to render the mixture acidic to a pH below about 5 and to precipitate alumina in hydrous form both from the sodium aluminate and from the aluminum sulfate, the weight ratio of water to $Na_2Al_2O_4$ in said sodium aluminate solution being at least about 15:1, and recovering the resultant product containing silica in hydrous form impregnated with alumina precipitated from the sodium aluminate in which the aluminum exists in the anion portion of the salt and from aluminum sulfate in which the aluminum exists in the cation portion of the salt, the aforementioned reactions taking place in the presence of gluconic acid, the quantity of said acid being between 1% and 10% by weight of the $Al_2O_3$, and the silica predominating over the alumina in said product.

10. A process for preparing silica-alumina microspheres which comprises precipitating silica in hydrous form by adding to a dilute alkaline sodium silicate solution a quantity of an aqueous sulfuric acid solution sufficient to give the resultant mixture a pH within the range of 8 to 10.5, adding to the resultant slurry a quantity of an aqueous solution of sodium aluminate sufficient to precipitate alumina, adding to the resultant slurry a dilute aqueous solution of aluminum sulfate sufficient to give the resultant slurry a pH of about 4.2 to about 5, the aforementioned reactions taking place in the presence of gluconic acid, the quantity of said acid being between 1% and 10% by weight of the $Al_2O_3$; filtering the resultant slurry, reslurrying the filter cake to a total solids content of at least 8% by weight of the composition, spray drying the resultant product, washing the resultant microspheres with water to remove soluble salts and drying the purified washed product at particle temperatures not exceeding 230° F., the quantities of said silicate and said aluminum salts being sufficient to produce a silica-alumina content of about 55% to 95% by weight of silica, expressed at $SiO_2$, and about 45% to 5% by weight of alumina, expressed as $Al_2O_3$, on a dry basis.

11. A product resulting from the process of claim 1.
12. A product resulting from the process of claim 10.

References Cited in the file of this patent
UNITED STATES PATENTS

| | | |
|---|---|---|
| 2,383,653 | Kirk | Aug. 28, 1945 |
| 2,392,767 | Robinson | Jan. 8, 1946 |
| 2,483,782 | Pierce | Oct. 4, 1949 |
| 2,562,888 | Bond | Aug. 7, 1951 |
| 2,635,056 | Powers | Apr. 14, 1953 |